United States Patent
Staebler

[11] 4,017,144
[45] Apr. 12, 1977

[54] RECORDING ASSEMBLY FOR VOLUME HOLOGRAPHY

[75] Inventor: David Lloyd Staebler, Lawrenceville, N.J.

[73] Assignee: RCA Corporation, New York, N.Y.

[22] Filed: Feb. 11, 1976

[21] Appl. No.: 657,032

[52] U.S. Cl. .................................. 350/3.5; 96/27 H
[51] Int. Cl.² ........................................ G03H 1/02
[58] Field of Search .................... 350/3.5; 96/27 H; 340/173 LM, 173 LT

[56] References Cited
OTHER PUBLICATIONS
B453,067, Mar., 1976, Kiemle, 350/3.5.

Primary Examiner—Ronald J. Stern
Attorney, Agent, or Firm—Edward J. Norton; Leonard Weiss

[57] ABSTRACT

A solid cylindrical recording medium is axially rotatable within a cavity in a transparent block, the medium and the cavity being complementary in shape. The medium and the block have substantially equal indexes of refraction whereby the medium does not refract light transmitted thereto through the block. Transmitted to the medium (through the block) is an object beam, representative of an image, and a reference beam, whereby the medium is exposed and a volume hologram of the image is recorded. A multiplicity of volume holograms of images may be recorded by rotating the medium with respect to the reference beam after each of a multiplicity of exposures.

5 Claims, 1 Drawing Figure

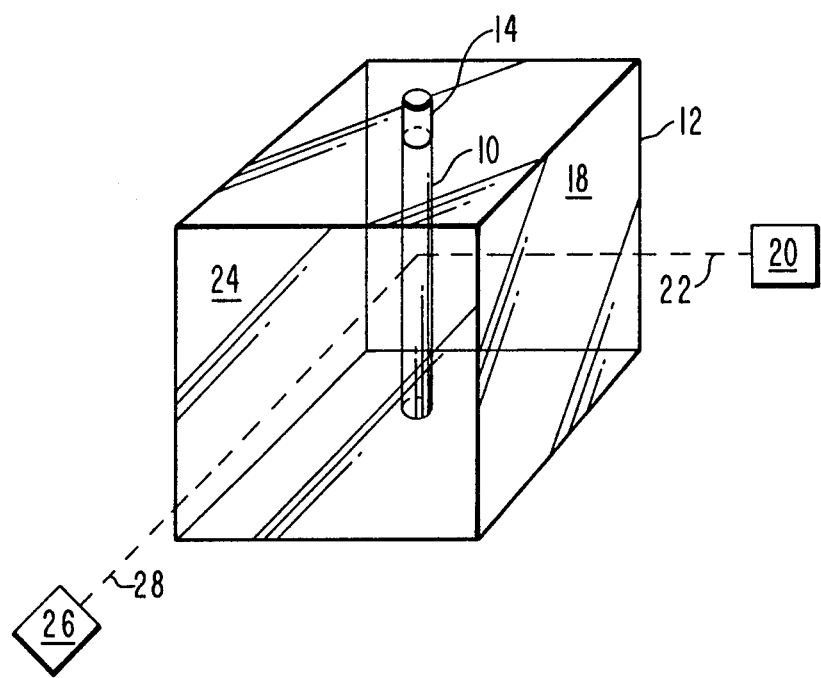

RECORDING ASSEMBLY FOR VOLUME HOLOGRAPHY

BACKGROUND OF THE INVENTION

1. Field of Invention

This invention relates to holography, and more particularly to volume holography.

2. Description of the Prior Art

A hologram is a diffraction grating having bars corresponding to fringes of an interference pattern formed by two coherent beams of light. The beams of light are referred to as an object beam and a reference beam. The hologram is formed by photographically recording the interference pattern, whereby the hologram corresponds to the interference pattern.

Typically, rays of the object beam are either shifted in phase or amplitude modulated to provide a representation of an image. Light rays comprising a holographic reconstruction of the image emanate from the hologram in response to a transmission thereto of a reconstructing beam of light.

In a volume hologram, the diffraction grating extends within a substantial portion of a recording medium which is much thicker than the spacing between adjacent bars of the diffraction grating. Unlike other types of holograms, the holographic reconstruction of the image emanates from the medium only when the reconstructing beam is transmitted along the same path over which the reference beam was transmitted during the recording of the volume hologram. Therefore, the volume hologram is angularly sensitive to the reconstructing beam. Because of this angular sensitivity, the recording medium may be used for recording a multiplicity of volume holograms as explained hereinafter.

To record a book, for example, the medium is exposed to record a volume hologram of an image of the first page of the book. After the recording of the first page, the medium is incrementally rotated (through an angle of one degree, for example) with respect to the reference beam. Thereafter, the medium is exposed to record a volume hologram of an image of the second page of the book and the medium is incrementally rotated as described hereinbefore. In a similar manner, as many as 360 pages of the book are recorded on the medium.

Since the medium is incrementally rotated after an exposure, a reconstructing beam causes a holographic reconstruction of an image of only one page at a time to emanate (from the medium). Accordingly, the medium may be rotated with respect to the reconstructing beam to cause a holographic reconstruction of an image of a desired page to emanate.

Typically, the recording medium is either a rectangular or a cylindrical solid. When the images are recorded on the rectangular solid, reconstructions thereof are spatially displaced from each other. Additionally, corners of the rectangular solid cause distortion of some of the reconstructed images. When the images are recorded on the cylindrical solid, the curvature thereof causes a focusing of the object and reference beams on a focal surface within the cylindrical solid, thereby causing distortion of the stored and the reconstructed images. Therefore, most recording mediums known in the prior art are unsuitable for recording a multiplicity of volume holograms.

SUMMARY OF THE INVENTION

According to the present invention, a holographic recording medium having the shape of a solid of revolution is axially rotatable within a cavity in a transparent block having a planar side, the recording medium and the cavity being substantially complementary in shape; the medium and the block have respective indices of refraction which are substantially equal.

BRIEF DESCRIPTION OF THE DRAWING

The sole FIGURE of the drawing is a perspective view of a volume hologram recording assembly in accordance with a preferred embodiment of the present invention.

DESCRIPTION OF THE PREFERRED EMBODIMENT

Referring to the drawing, a holographic recording assembly is comprised of a solid cylindrical recording medium 10 axially rotatable within a cavity in a transparent block 12. The medium 10 and the cavity are substantially complementary in shape, causing a close fit to be formed between the medium 10 and the block 12.

Integral with the medium 10 is an extension 14 that extends from the cavity. Accordingly, the extension 14 may be rotated to cause an axial rotation of the medium 10. In an alternative embodiment, a recording medium may have the shape of a solid of revolution other than a cylinder.

The medium 10 and the block 12 are preferably made from an alpha-diketone dissolved and cast in a polymeric host, therefore, the medium 10 and the block 12 have substantially equal indices of refraction. Additionally, the medium 10 is photosensitive, whereby a volume hologram may be recorded thereon; the block 12 is not photosensitive.

It should be understood that a lens disposed in an atmospheric environment, for example, refracts, and thereby focuses light because of a difference of the index of refraction of the lens from the index of refraction of the atmosphere. When the lens and the surrounding environment have equal indices of refraction, light is neither refracted nor focused by the lens. Therefore, because the medium 10 and the block 12 have substantially equal indices of refraction (and the close fit therebetween), the medium 10 does not focus light.

The block 12 has a planar side 18 that receives from a source 20 an object beam 22 having rays which are phase-shifted to provide a representation of a first image. The beam 22 is transmitted to the medium 10 through the block 12.

In a similar manner, the block 12 has a planar side 24 that receives from a source 26 a reference beam 28. The beam 28 is transmitted to the medium 10 through the block 12. In response to the beams 22, 28 being transmitted to the medium 10, a first interference pattern is formed thereon. The forming of the first interference pattern causes a recording of a volume hologram of the first image. In an alternative embodiment, an object beam and a reference beam may both be transmitted through one planar side of a block.

After the recording of the volume hologram of the first image, the rays of the beam 22 are phase-shifted to provide a representation of a second image. Additionally, the medium 10 is incrementally rotated (axially), whereby the medium 10 is positioned to record a volume hologram of a second image. In response to the beams 22, 28 being transmitted to the recording medium 10, a second interference pattern is formed thereon whereby the volume hologram of the second image is recorded. In a manner similar to that described hereinbefore, a multiplicity of volume holograms may be recorded by the medium 10.

The cavity may be lubricated by a lubricant, such as silicon oil, whereby the medium 10 and the block 12 have the lubricant therebetween. The lubricant reduces scattering of light within the cavity and abrasion therein between the medium 10 and the block 12 during the incremental rotation. Additionally, when the lubricant, the medium 10, and the block 12 all have substantially equal indices of refraction, the lubricant is optically a part of the block 12 thereby forming a close complementary fit between the medium 10 and the block 12.

Thus, there is described hereinbefore an assembly which records a multiplicity of undistorted volume holograms.

What is claimed is:
1. A holographic recording assembly, comprising:
    a transparent block having a cavity therein, a side of said block being planar; and
    a holographic recording medium having the shape of a solid of revolution and an index of refraction substantially equal to the index of refraction of said block, said medium being axially rotatable within said cavity, the shapes of said cavity and said medium being substantially complementary.
2. The assembly of claim 1 wherein said medium is a cylindrical solid.
3. The assembly of claim 1 wherein said block and said medium are comprised of an alpha-diketone dissolved and cast in a polymeric host.
4. The assembly of claim 1 additionally comprising a lubricant between said medium and said block.
5. The assembly of claim 4 wherein said medium, said block and said lubricant all have substantially equal indices of refraction.

* * * * *